United States Patent
Lei

(10) Patent No.: US 9,451,543 B2
(45) Date of Patent: Sep. 20, 2016

(54) WIRELESS COMMUNICATION METHOD FOR TRANSMITTING MESSAGE TO SLAVE DEVICES FROM MASTER DEVICES

(75) Inventor: Zhaojun Lei, Shenzhen (CN)

(73) Assignee: SHENZHEN HAC TELECOM TECHNOLOGY CO., LTD., Shenzhen (CN)

(*) Notice: Subject to any disclaimer, the term of this patent is extended or adjusted under 35 U.S.C. 154(b) by 169 days.

(21) Appl. No.: 14/361,311

(22) PCT Filed: May 15, 2012

(86) PCT No.: PCT/CN2012/075502
§ 371 (c)(1),
(2), (4) Date: May 29, 2014

(87) PCT Pub. No.: WO2013/170436
PCT Pub. Date: Nov. 21, 2013

(65) Prior Publication Data
US 2014/0307608 A1    Oct. 16, 2014

(51) Int. Cl.
*H04W 52/02* (2009.01)
*H04W 84/20* (2009.01)
*H04W 76/04* (2009.01)

(52) U.S. Cl.
CPC ..... *H04W 52/0212* (2013.01); *H04W 52/0219* (2013.01); *H04W 52/0229* (2013.01); *H04W 52/0245* (2013.01); *H04W 52/0248* (2013.01); *H04W 84/20* (2013.01); *H04W 76/048* (2013.01)

(58) Field of Classification Search
CPC ............ H04W 52/0212; H04W 52/0248; H04W 52/0245; H04W 52/0219; H04W 52/0229; H04W 84/20; H04W 76/048
See application file for complete search history.

(56) References Cited

U.S. PATENT DOCUMENTS

| | | | |
|---|---|---|---|
| 5,896,561 A * | 4/1999 | Schrader | H04L 1/0025 370/445 |
| 2003/0068024 A1* | 4/2003 | Jones | H04L 12/12 379/102.04 |
| 2005/0078614 A1* | 4/2005 | Haartsen | H04B 1/7156 370/260 |
| 2008/0219210 A1* | 9/2008 | Shuey | G01D 4/006 370/329 |
| 2011/0008054 A1* | 1/2011 | Castanon Avila | H04B 10/5055 398/140 |

FOREIGN PATENT DOCUMENTS

CN        102438301 A        5/2012

OTHER PUBLICATIONS

International Search Report of PCT Application No. PCT/CN2012/075502.

* cited by examiner

*Primary Examiner* — Joshua Kading

(57) ABSTRACT

A method and system for wireless communication are provided. The method for wireless communication comprises following steps. The master device encodes an information code sequence including a communication demand into a wake-up sequence and transmits the wake-up sequence to each slave device continuously within a preset time period. The slave device receives the wake-up sequence in the detecting period, decodes the wake-up sequence, judges the correlation between the at least two parts, determines whether to be waken-up according to a judging result and performs corresponding response according to the decoding information. When implementing the technical solution in this invention, the power consumption in the wireless communication is reduced, the encoding efficiency is enhanced and the communication process is simpler.

6 Claims, 4 Drawing Sheets

A master device encodes an information code sequence including the communication demand into an awakening sequence and transmits the awakening sequence to each slave device continuously within a preset time period. The awakening sequence comprises at least two parts which have a preset correlation with each other, and the preset time period is larger than or equal to a sum of a sleeping period and a detecting period of the slave device, wherein the sum of the sleeping period and the detecting period constitutes a sleeping-and-waking    S1

A slave device receives the awakening sequence in the detecting period, decodes the awakening sequence, judges the correlation between the at least two parts, determines whether to be awakened according to a judging result and performs corresponding response according to the decoding information.    S2

WIRELESS COMMUNICATION METHOD FOR TRANSMITTING MESSAGE TO SLAVE DEVICES FROM MASTER DEVICES

FIELD OF THE INVENTION

The present invention relates to the technical field of communication, and more specifically relates to a wireless communication system and method.

BACKGROUND

Micro-power (short-range) wireless communication technology has emerged since the end of the last century, and it has been widely used in the following fields including industrial control, home intelligence, wireless remote control, security alarm, environmental monitoring, smart meter reading, toxic and harmful gas monitoring, logistics, RFID and the like after ten years of development. In recent years, the Internet of Things has been regarded as a new growth point of the future economic development after the financial crisis in domestic and international ranges. As a result, the short-range wireless communication technology will further develop in the applications of Internet of Things (especially sensor network).

The concept of Internet of Things is almost appearing at the same time with the low-carbon economy. As one of the primary communication means for the Internet of Things, the short-range wireless digital communication technology is bound to develop towards the direction with low power and micro power while complying with the developing trend that demands low-carbon and low energy consumption. In addition, battery-powered products become more and more and much stricter with the power consumption with the increasing spread of applications of mobile communication devices.

So, how to reduce the overall power consumption of the wireless communication device? Obviously, it is unrealistic only to decrease the transmitting power of the transmitter or only to reduce the current consumption of the receiver. The effect of this method is not obvious, and it will also result in harsh consequences, namely reduction in communication quality. The purpose of reducing power can be achieved only by forcing the communication device to sleep at idle period which can greatly reduce the average power consumption of the communication device. At the same time, the life of battery can be prolonged several times or even thousands of times in the battery-powered devices.

For half-duplex wireless communication system or network composed of two or more wireless transceiver devices with any structure or protocol, the time that a certain device works in transmission or reception is indeed very little. It can greatly reduce the average power consumption by making the communication device enter the sleep mode when it does not work in transmission or reception. Since the current consumption in the sleep mode is only at a micro-ampere level and even can be a few microamps, while the transmitting current of the wireless communication device is more than tens of milliamps and the receiving current is between a dozen milliamps and tens of milliamps, the longer the sleeping period is, the lower the average power consumption of the communication system that employs the sleep mechanism is.

When a single or a group of wireless communication devices are in the sleep mode without receiving or transmitting, i.e. in a non-working state, communication will fail when other communication devices demand to communicate with them. Thus, a set of processes or methods are preferred to make the wireless communication device in the sleep mode perceive and perform communications when other devices need to communicate with it, that is, to awaken the wireless communication device in the sleep mode. Currently, there have been many methods to awaken the wireless communication devices from the sleep mode such as waking up regularly, waking up through certain signal strength and waking up through data packet. However, regarding these waking-up methods, some require synchronization in time for all communication devices in the wireless communication system, some are weak in the anti-interference capability to cause a false awakening, and others take a long time during the detection period which leads to large power consumption. Besides, communication protocol and communication process are relatively complex and last for a long time as well.

SUMMARY

The objective of the present invention is to provide a wireless communication method which is lower in power consumption and simple in both communication protocol and communication process, aiming at the defects of large power consumption and complex communication protocol and communication process in the prior art.

In an aspect of present application, a wireless communication method is provided for transmitting a message to a slave device when a master device has a communication demand, which comprises:

S1, the master device encodes an information code sequence including the communication demand into an awakening sequence and transmits the awakening sequence to each slave device continuously within a preset time period, wherein, the awakening sequence comprises at least two parts which have a preset correlation with each other, and the preset time period is larger than or equal to a sum of a sleeping period and a detecting period of the slave device, wherein the sum of the sleeping period and the detecting period constitutes a sleeping-and-awakening cycle;

S2, the slave device receives the awakening sequence in the detecting period, decodes the awakening sequence, judges the correlation between the at least two parts, determines whether to be awakened according to a judging result and performs a corresponding response according to the decoding information.

In the wireless communication method of the present invention, the step S1 comprises:

S11, the master device generates the information code sequence according to the communication demand and outputs the information code sequence in at least two channels;

S12, the information code sequence in at least one channel is encoded to output an encoded result;

S13, outputs in each channel are combined, and a combination result is copied for several times to generate the awakening sequence according to the preset time period and a baud rate;

S14, the awakening sequence is transmitted to each slave device continuously within the preset time period.

In the wireless communication method of the present invention, the step S1 comprises:

S16, the master device generates the information code sequence according to the communication demand, and outputs the information code sequence repeatedly in at least two channels according to the preset time period, the baud rate and a redundancy;

S17, the information code sequence in at least one channel is encoded to output an encoded result;

S18, outputs in each channel are combined to generate the awakening sequence;

S19, the awakening sequence is transmitted to each slave device continuously within the preset time period.

In the wireless communication method of the present invention, the step of combining the outputs in each channel is to acquire symbols of the outputs in each channel alternately.

In the wireless communication method of the present invention, the step S2 comprises:

S21, the slave device receives the awakening sequence in the detecting period;

S22, the awakening sequence is divided into at least two channels;

S23, the awakening sequences in the at least two channels are encoded or decoded correspondingly to output a result;

S24, the correlation between outputs in each channel is judged so as to determine whether to be awakened according to the judging result and then the corresponding response is performed according to the decoding information.

In the wireless communication method of the present invention, the step S24 comprises:

S241, a bit exclusive-or operation is carried out on the outputs in each channel;

S242, it is judged that whether a number of continuous 0s in the output exceeds a preset value, or whether a ratio of a number of 1s to an entire number of the symbols in the output is smaller than a preset limit, if so, the corresponding response is performed according to the communication demand; or else, the slave device enters a sleeping state.

In the wireless communication method of the present invention, the method further comprises the following steps after the step S24:

S25, the bit exclusive-or operation is carried out on the output in each channel;

S26, a communication quality of a channel is judged according to the ratio of the number of 1s to the entire number of the symbols in the output.

In the wireless communication method of the present invention, the method further comprises the following steps after the step S2:

S3, an error correction decoder is used to perform an error correction decoding on the received awakening sequence or the outputs in at least two channels so as to correct error codes during the communication and generate a right information code sequence.

In the wireless communication method of the present invention, the communication quality of the channel is judged according to the ratio of the number of 1s to the entire number of the symbols in the output during the error correction decoding.

In the wireless communication method of the present invention, when the awakening sequence generated by the master device is then inverted or scrambled, the slave device firstly inverts or descrambles the awakening sequence and then decodes it after receiving the awakening sequence in the detecting period in the step S2.

In the wireless communication method of the present invention, in the step S1, each data packet of the awakening sequence carries a latency time information that is obtained by the slave device to calculate a time when the master device stops transmitting the awakening sequence in the preset time period.

In the step S2, after receiving a segment of the awakening sequence in the detecting period, the slave device extracts the latency time information of a corresponding data packet, determines the time when the master device stops transmitting the awakening sequence in the preset time period according to the extracted latency time information, and starts to sleep before a determined time.

In the wireless communication method of the present invention, the communication demand comprises broadcasting awakening, grouping awakening, individual awakening, control instruction and data transmission.

In the wireless communication method of the present invention, after the awakening sequence is generated, a multi-system encoding and a wireless modulation are carried out on logic 0s or 1s in the awakening sequence sequentially, and the modulated awakening sequence is transmitted to each slave device continuously within the preset time period.

In the wireless communication method of the present invention, after the awakening sequence is generated, a Manchester encoding, a non-return-to-zero encoding or a return-to-zero encoding and a wireless modulation are carried out on logic 0s or 1s in the awakening sequence, and after which, the encoded awakening sequence by means of Manchester encoding, non-return-to-zero encoding or return-to-zero encoding is transmitted to each slave device within the preset time period continuously.

In another aspect of present application, a wireless communication system is also provided, which comprises a master device and at least one slave device, wherein the master device transmits a message to the slave device when having a communication demand, the master device comprises:

an encoding module operable to encode an information code sequence including the communication demand into an awakening sequence; wherein the awakening sequence comprises at least two parts which have a preset correlation with each other;

a transmitting module operable to transmit the awakening sequence to each slave device continuously within a preset time period; the preset time period is larger than or equal to a sum of a sleeping period and a detecting period of the slave device, wherein the sum of the sleeping period and the detecting period constitutes a sleeping-and-awakening cycle;

the slave device comprises:

a receiving module operable to receive the awakening sequence in the detecting period;

a decoding module operable to decode the awakening sequence, judge the correlation between the at least two parts, determine whether to be awakened according to a judging result and perform corresponding response according to the decoding information.

When implementing the technical solution of the present invention, since the at least two parts of the awakening sequence transmitted by the master device have a preset correlation with each other, the slave device can judge that the received signal is from the master device only by judging out the preset correlation between at least two parts of the awakening sequence when receiving the awakening sequence in the detecting period. However, the slave device can judge so when it receives a noise or an interference signal since the symbols of the noise or the interference signal do not have any correlation or the preset correlation with each other. In this way, the slave device is prevented from a false awakening caused by the noise or the interference signal, thereby enhancing the anti-inference capability as well as solving the problems of identification and false awakening. Meanwhile, the width of the detecting period can be very narrow at the receiving end due to the adoption of dynamic encoding so as to reduce the power consumption. Besides, the awakening sequence has gathered bit synchronization information, packet synchronization information, awakening information, data and error-correction together, which thus results in high encoding efficiency as well as simple and reliable communication process.

BRIEF DESCRIPTION OF THE DRAWINGS

The present invention is further described with reference to the accompanying drawings and embodiments in the following. In the figures.

DETAILED DESCRIPTION

Figure 1:
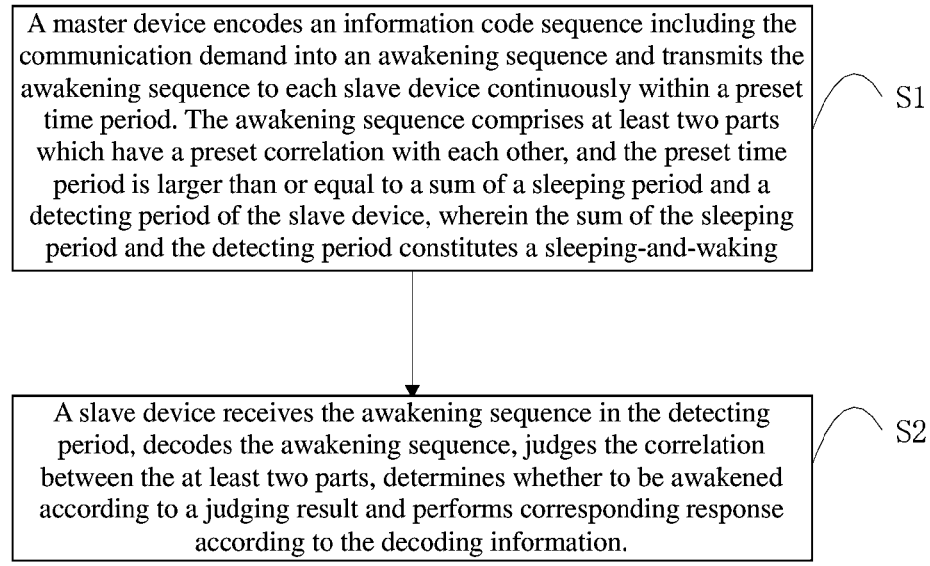
FIG. 1 is a flow chart for an embodiment of the wireless communication method in the present invention.

As shown in FIG. 1, in a flow chart for an embodiment of the wireless communication method in the present invention, the wireless communication method operates to transmit a message to a slave device when a master device has a communication demand. Herein, the wireless communication method comprises following steps.

In step S1, the master device encodes an information code sequence including the communication demand into an awakening sequence and transmits the awakening sequence to each slave device continuously within a preset time period, the awakening sequence comprises at least two parts which have a preset correlation with each other, and the preset time period is larger than or equal to a sum of a sleeping period and a detecting period of the slave device, wherein the sum of the sleeping period and the detecting period constitutes a sleeping-and-awakening cycle.

In step S2, the slave device receives the awakening sequence in the detecting period, decodes the awakening sequence, judges the correlation between the at least two parts, determines whether to be awakened according to a judging result and performs a corresponding response according to the decoding information.

When implementing this technical solution, since the at least two parts of the awakening sequence transmitted by the master device have a preset correlation with each other, the slave device can judge that the received signal is from the master device only by judging out the preset correlation between at least two parts of the awakening sequence when receiving the awakening sequence in the detecting period. However, the slave device can judge so when it receives a noise or an interference signal since the symbols of the noise or the interference signal do not have any correlation or the preset correlation. In this way, the slave device is prevented from a false awakening caused by the noise or the interference signal. Meanwhile, the receiving end can carry out the correlation judgment starting with any one of received right symbols due to the adoption of dynamic encoding, in which case the width of the detecting period can be very narrow at the receiving end so as to reduce the power consumption. Besides, the awakening sequence has gathered bit synchronization information, packet synchronization information, awakening information, command, data and error-correction together, which thus results in high encoding efficiency as well as simple and reliable communication process.

In one embodiment of the present invention, after the master device generates the awakening sequence, a multi-system encoding and a wireless modulation are carried out on logic 0s or 1s in the awakening sequence sequentially, and the modulated awakening sequence is transmitted to each slave device continuously within the preset time period. Herein, the multi-system encoding can be a binary encoding, a ternary encoding, a quaternary encoding or a quinary to a hexadecimal encoding, and the wireless modulation can be an amplitude shift keying, a frequency shift keying or a phase shift keying. Accordingly, the slave device firstly conducts a corresponding wireless demodulation before a corresponding multi-system decoding when it has received the signal. Of course in another embodiment of the present invention, after the awakening sequence is generated, a Manchester encoding, a non-return-to-zero encoding or a return-to-zero encoding and a wireless modulation are carried out on logic 0s or 1s in the awakening sequence. After that, the encoded awakening sequence by means of Manchester encoding, non-return-to-zero encoding or return-to-zero encoding is transmitted to each slave device within the preset time period continuously.

In another embodiment of the present invention, in the step S1, the awakening sequence generated by the master device is then preferably inverted or scrambled by the master device. In this situation, the slave device firstly inverts or descrambles the awakening sequence and then decodes it after receiving the awakening sequence in the detecting period in the step S2.

Figure 2:
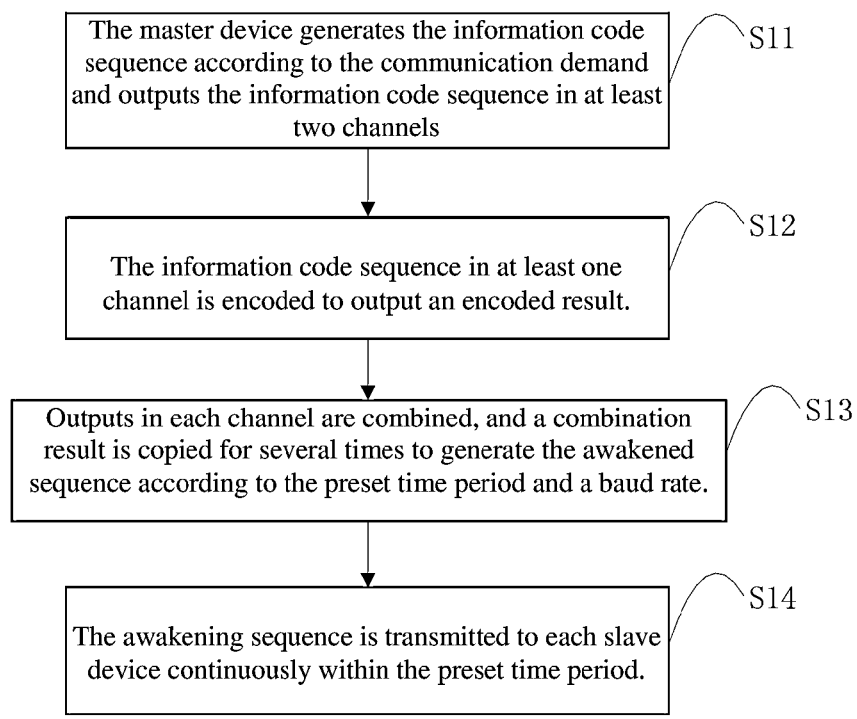
FIG. 2 is a flow chart for an embodiment of step S1 in FIG. 1.

FIG. 2 is a flow chart for an embodiment of the step S1 in FIG. 1. In this embodiment, the step S1 comprises following steps.

In step S11, the master device generates the information code sequence according to the communication demand and outputs the information code sequence in at least two channels.

In step S12, the information code sequence in at least one channel is encoded to output an encoded result.

In step S13, outputs in each channel are combined, and a combination result is copied for several times to generate the awakening sequence according to the preset time period and a baud rate. Preferably, combing the outputs in each channel in this step refers to acquiring symbols of the output in each channel.

In step S14, the awakening sequence is transmitted to each slave device continuously within the preset time period.

Figure 3:
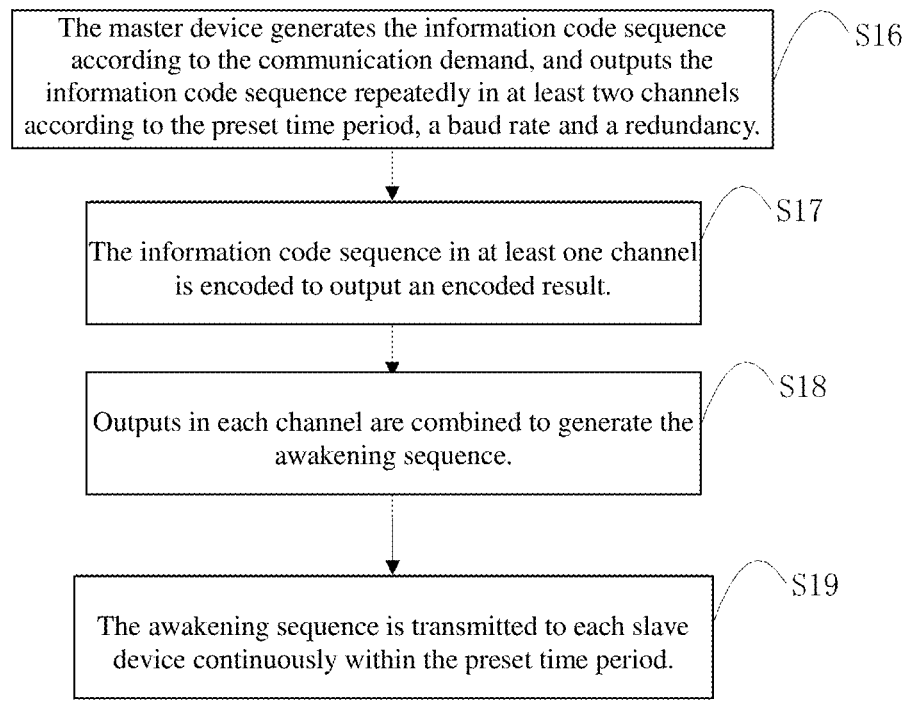
FIG. 3 is a flow chart for a preferred embodiment of step S1 in FIG. 1.

FIG. 3 is a flow chart for a preferred embodiment of the step S1 in FIG. 1. In this embodiment, the step S1 comprises following steps.

In step S16, the master device generates the information code sequence according to the communication demand, and outputs the information code sequence repeatedly in at least two channels according to the preset time period, the baud rate and a redundancy.

In step S17, the information code sequence in at least one channel is encoded to output an encoded result.

In step S18, outputs in each channel are combined to generate the awakening sequence.

In step S19, the awakening sequence is transmitted to each slave device continuously within the preset time period.

Figure 4:
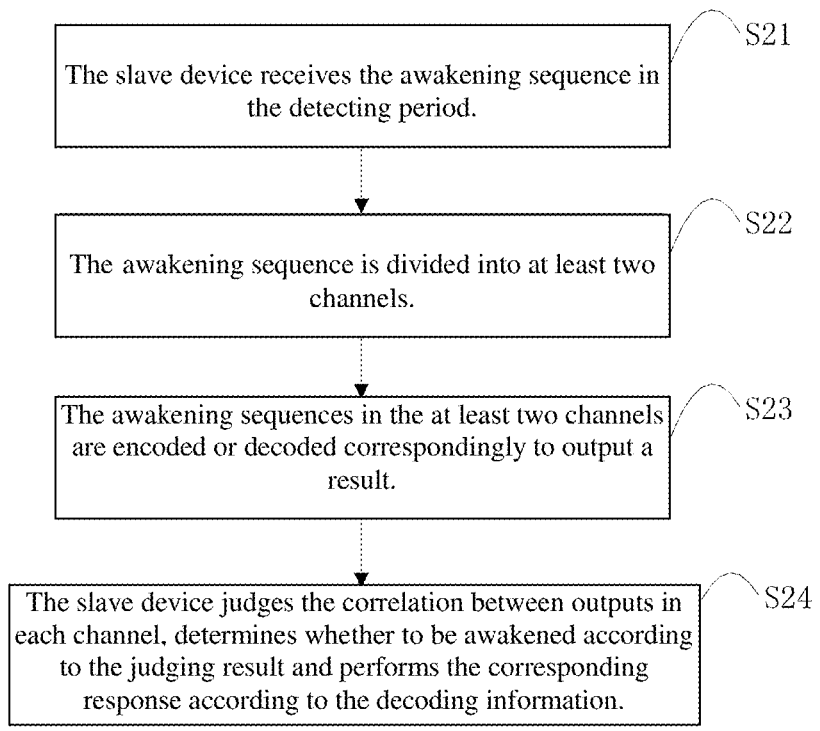
FIG. 4 is a flow chart for an embodiment of step S2 in FIG. 1.

FIG. 4 is a flow chart for an embodiment of the step S2 in FIG. 1. In this embodiment, the step S2 comprises following steps.

In step S21, the slave device receives the awakening sequence in the detecting period.

In step S22, the awakening sequence is divided into at least two channels.

In step S23, the awakening sequences in the at least two channels are encoded or decoded correspondingly to output a result.

In step S24, the slave device judges the correlation between outputs in each channel, determines whether to be awakened according to the judging result and performs the corresponding response according to the decoding information.

In one preferred embodiment, the step S24 is as follows: a bit exclusive-or operation is carried out on the outputs in each channel and the number of several continuous 0s in the output is counted; it is then judged that whether the number of the several continuous 0s in the output exceeds a preset value, or whether the ratio of the number of 1s to the entire number of the symbols in the output is smaller than a preset limit; if so, it is continued to receive a piece of data which is long enough, the information transmitted from the master device is obtained at the decoding output, processed and translated to get the communication demand, and the corresponding response is performed according to the communication demand; or else, the slave device enters a sleeping state. In an ideal situation, all of the results of the bit exclusive-or operation should be 0 when the awakening sequence transmitted from the master device to the slave device has no error codes or code losses. However, since error codes are certainly present during a normal communication, the correlation can be specified provided that the number of continuous 0s in the output exceeds the preset limit. The larger the number of continuous 0s is, the stronger the correlation is, which means the awakening data is received with lower probability of false judgment. Of course, the judgment that whether the ratio of the number of 1s to the entire number of the symbols in the output is smaller than a preset limit can also employed to judge the correlation. For example, it is considered to be correlated and the awakening data has been received in the case that the result of the bit exclusive-or operation is an output with 32 symbols while the number of 1s in the output is 3, thereby preventing the false negative in this way. In another embodiment, if the master device inverts the output in a certain channel during encoding, the step S24 will be as follows: a bit exclusive-or operation is carried out on the outputs in each channel and the number or the ratio of continuous 1s in the output is counted; it is then judged that whether the number of continuous 1s in the output exceeds a preset value; if so, the corresponding response is performed according to the communication demand; or else, the slave device enters a sleeping state. Similarly, in another embodiment, if the master device scrambles the output in a certain channel during encoding, the step S24 will be as follows: a bit exclusive-or operation is carried out on the outputs in each channel and the number of continuous special character string in the output is counted; it is then judged that whether the number of continuous special character string in the output exceeds a preset value; if so, the corresponding response is performed according to the communication demand; or else, the slave device enters a sleeping state.

In addition, a communication quality of a channel can be judged according to the output. For example, after the step S24, a bit exclusive-or operation is carried out on the outputs in each channel, and the communication quality of the channel is judged according to the ratio of the number of 1s to the entire number of the symbols in the output. The communication quality of the channel can also be judged according to the ratio of the number of 1s to the entire number of the symbols in the output during the process of error correction decoding.

In another preferred embodiment, the communication method further comprises that an error correction decoder is used to perform an error correction decoding on the received awakening sequence or the outputs in at least two channels. That is, in order to correct an error code during the communication, generate the right information code sequence, reduce the probability of error code and increase the success rate of communication, the error correction decoding can be independent of or utilize the correlation operation in the step S24. Preferably, the error correction decoder is a forward error correction (FEC) decoder.

Figure 5:
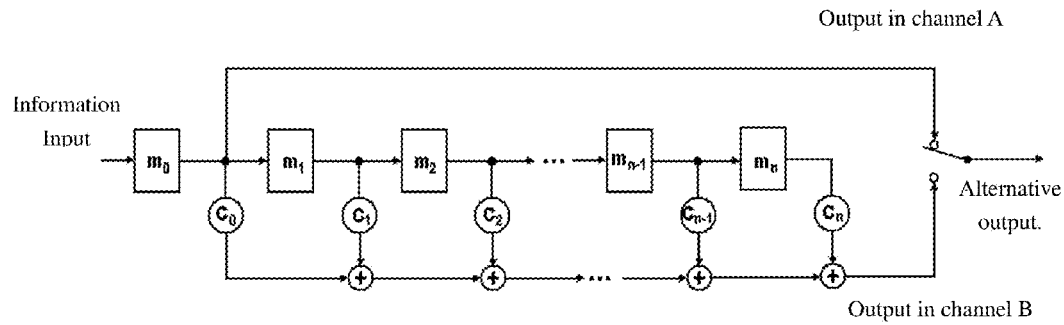
FIG. 5 is a diagram illustrating logic structure for an embodiment of the encoder used by the master device in the wireless communication method in the present invention.

The wireless communication method of the present invention listed below is illustrated with reference to one specific embodiment. In a master device and in connection with the decoders utilized in the master device as shown in FIG. 5, $m_0, m_1, m_2 \ldots n_{n-1s}$ and $m_n$ designate shift registers, wherein the initial values for all of them can be any value or are preferred to be 0, n is an order of the shift register, and + represents modulo-2 addition or exclusive-or operation. $C_0, C_1, C_2 \ldots C_{n-1s}$ and $C_n$ are weighted values of a tapping, which can be 0 or 1. In the event of 0, it means there is no tapping and this bit is not involved in the operation. Herein, not all of the $C_0, C_1, C_2 \ldots C_{n-1}$ and $C_n$ can be 0, and the tapping mode is preferred to have good correlation and strong error correction capability, wherein convolutional code belongs to one of the error correction modes with good performance. In this method, the master device firstly generates an information code sequence according to a communication demand, calculates the number of repeat N needed for the information code sequence according to a preset time period, a baud rate and a redundancy, copies the information code for N−1 times (including the original information code sequence), and outputs the information code sequence into an encoder in two channels. In this encoder, the information code in channel A is outputted directly, while the one in channel B is outputted after the operation of the shift register $m_0, m_1, m_2 \ldots m_{n-1}, m_n$ and the weighted value of the tapping $C_0, C_1, C_2 \ldots C_{n-1}$ and $C_n$. That is, in the process of inputting the information code sequence, one-digit information code is obtained in the channel A, one-digit redundant code is obtained in the channel B and the relation between the redundant code and the information code is determined by $C_0, C_1, C_2 \ldots C_{n-1}$ and $C_n$ when one-digit information symbols is inputted. Instead, any other operations can certainly be carried out in the channel A before the outputting. Herein, the final encoded output of the master device is the alternative outputs in both channel A and channel B, i.e. the awakening sequence is formed as follows: one-digit information code is outputted in the channel A, one-digit redundant code is then outputted in the channel B, and a next one-digit information code and a next one-digit redundant code are respectively outputted in the channels A and B alternatively after the shift and the operation, which circulates till all of the information code sequences have been shifted. Or otherwise, the awakening sequence is formed as follows: one-digit redundant code is outputted in the channel B at first, one-digit information code is then outputted in the channel A, and a next one-digit redundant code and a next one-digit information code are respectively outputted in the channels B and A alternatively after the shift and the operation, which circulates till all of the information code sequences have been shifted.

With respect to FIG. 5, when the master device has the communication demand, information to be transmitted is generated through a NRZ encoding or a Manchester encoding and a modulation process of the generated awakening sequence. After that, the master device calculates the required number of transmitting N and makes N−1 copies of the information to be transmitted according to some parameters including the size of information amount, a baud rate and a continuous transmission time $T_s$. Of course, in another one embodiment, the information code sequence can be inputted into the encoder repeatedly to form one information bit stream which is N times of the original information. The information bit stream is then encoded into the awakening sequence which is transmitted to each slave device after the NRZ encoding or the Manchester encoding and the modulation process. It should be explained that due to the lack of specially transmitted bit synchronization code, the Manchester encoding is a preferred means which makes the receiving circuit of the slave device separate the bit synchronization code quickly and precisely.

Figure 6:
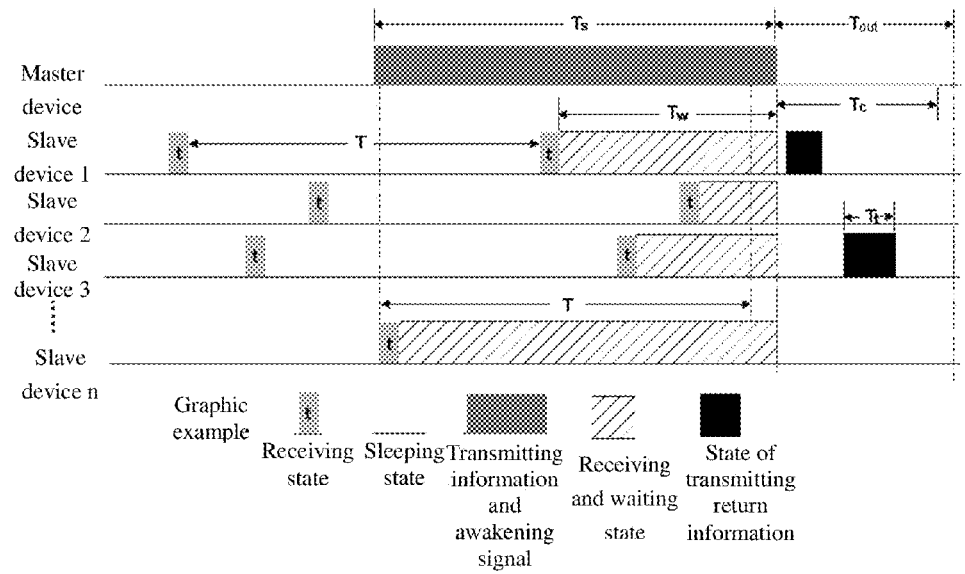
FIG. 6 is a sequence diagram for an embodiment of the wireless communication method in the present invention.
Figure 7:
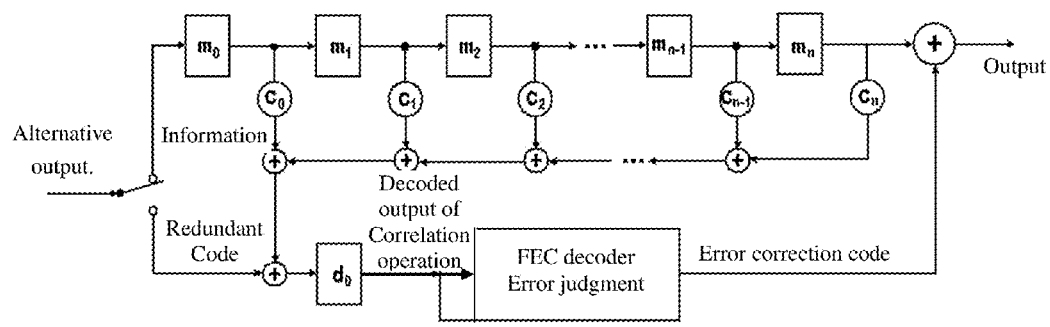
FIG. 7 is a diagram illustrating logic structure for an embodiment of the decoder used by the slave device in the wireless communication method in the present invention.

With respect to FIG. 6, the slave device receives and detects for a duration time of t (detecting period) every other time T (sleeping period), which means when Ts≥T+t, an awakening data can cover any slave device in the system reliably which detects by taking the T+t as the sleeping-and-awakening cycle. The slave device receives a segment of symbols within any detecting period t, while such segment of symbols may have a small segment of error since the bit synchronization separation circuit takes a short while to be stable. In the actual implementation, the symbols received during the period of unstable bit synchronization separation is dropped, and only the symbols received during a time t of stable bit synchronization separation is processed. At this time, if the master device does not transmit the awakening data, a noise or an interference signal will be received. In the event of the noise, the symbols have no correlation with each other, while in the event of the interference signal, the correlation does not exist or it is different from the preset correlation, which can be judged out by means of decoding. If the information is received from the master device, the decoding is carried out by the decoder shown in FIG. 7, in which case the awakening data is determined to be received by judging out that the preset correlation exists between two parts of the awakening sequence. In the slave device, the decoding principle of the decoder is as follows: at first, it should be explained that shift registers $m_0, m_1, m_2 \ldots m_{n-1}, m_n$ and weighted values of a tapping $C_0, C_1, C_2 \ldots C_{n-1}, C_n$ in this decoder are the same as those in the encoder of the master device. After receiving the awakening sequence, the slave device firstly divides the awakening sequence into two channels, wherein one is an information code sequence and the other one is a redundant code sequence. A bit exclusive-or operation is carried out between the redundant code sequence and the result obtained from an operation on the information code sequence through the shift registers $m_0, m_1, m_2 \ldots m_{n-1}, m_n$ and the weighted values of the tapping $C_0, C_1, C_2 \ldots C_{n-1}$, $C_n$. Besides, a comparison is performed between the operation results and the comparative results are put into a shift register $d_0$. Since the information code sequence is subjected to the same encoding operations in both the master device and the slave device, all of the outputs of the shift register $d_0$ should be 0 without any error codes or code losses. However, in the actual response, the correlation between two channels can be judged out by counting the number of continuous 0s in the output of the shift register $d_0$. More specifically, the larger the number of continuous 0s is, the stronger the correlation is, which means the awakening data is received with lower probability of false judgment. In order to reduce the power consumption and the false judgment, the time t can be decreased and fewer digits can be used when judging the correlation. Additionally, more digits is continued to be received for the correlation judgment at a longer digit after a preliminary judgment of the correlation is obtained. In this way, the power consumption is reduced and the false judgment is prevented. In addition, an FEC decoding is implemented for a forward error correction to generate an error correction code sequence at the same time with the correlation judgment by operation. A bit exclusive-or operation is carried out between the error correction code sequence and the encoded information code sequence to obtain the right information code sequence. A valid data is received, synchronization is implemented according to packet synchronization information in the information code and a response is performed according to the communication demand represented by the information code sequence. It should be explained that the FEC decoder can be completely independent of the correlation operation, and the decoding method has many variants instead of being limited to this example.

In one preferred embodiment of the present invention, each data packet of the awakening sequence in the master device carries a latency time information by which the slave device obtains and calculates the time when the master device stops transmitting the awakening sequence in the preset time period. In the step S2, after receiving a segment of the awakening sequence in the detecting period, the slave device extracts the latency time information of the corresponding data packet, determines the time when the master device stops transmitting the awakening sequence in the preset time period according to the extracted latency time information, and starts to sleep before a determined time. In FIG. 6, the value of the latency time $T_w$ is obtained through the above-mentioned operations. Thus the slave device enters the sleeping state during $T_w$ to further reduce the power consumption. For example, in one specific example, the number of transmitting the information packet N is determined according to the baud rate, the redundancy and the preset time period, wherein N is put into a first packet information as a number, N−1 is put into a second packet information, and the rest may be processed by analogy till 1 is put into the last packet data. That is, as the master device is copying the information, other information except this value is the same. When the slave device has received the segment of the awakening sequence in the detecting period, it extracts the corresponding number of the data packet and calculates the time substantially needed for waiting the master device to finish transmitting the awakening signal according to the extracted number as well as the length and baud rate of each packet. The slave device starts to sleep in this period. Taking the slave device 1 as an example, the time i.e. the latency time is determined to be $T_w$. The slave device can enter the sleeping state during this time to further reduce the power consumption.

Additionally with respect to FIG. 6, $T_t$ is the response of the slave device to the awakening sequence transmitted by the master device. The awakening sequence can be broadcasting awakening, grouping awakening, individual awakening aiming at a single certain slave device, control instruction and data transmission. When this wireless communication method is applied in wireless meter reading of water meter, gas meter and heat meter, the awakening command is mainly to open and close the valve mounted on these meters. The slave device receives and interprets the command, and further determines whether to respond according to the situation. If a responds is carried out, the slave device will transmit a response data packet, which is as the Tt of the slave device 3 in FIG. 6; if not, the slave device will enter the sleep and this communication will end up, which is as the slave device 2 in FIG. 6. Definitely, it is not needed to calculate the Tw if the response is not required; instead, the slave device can enter the sleep immediately after it has received a complete data.

In the master device, the encoded bit stream is a combination result of multi-channel encodings, such as the alternative collection of the symbols in each channel. However, the slave device cannot judge that the symbols received currently is the information code or the redundant code at its receiving end. For these reasons, the following method in which a plurality of same decoders run simultaneously can be adopted. For example, two decoders are designed in this example. Herein, the odd bit and the even bit are respectively supposed to be the information code and the redundant code in one channel. The other channel is on the contrary; that is, the odd bit and the even bit are respectively the redundant code and the information code. The correlation judgment in the wrong channel is also not correct, which is thus not considered. In another one embodiment, since the slave device may start to decode and receive the information packet from any one position when it is awakened, the slave device may add an identification of several bits in the head of its transmitted information packet. These identifications can be transmitted repeatedly and can be used to find the starting of the data packet when the slave device has decoded to obtain the information, so that the data packet is synchronized and is interpreted correctly.

Figure 8:
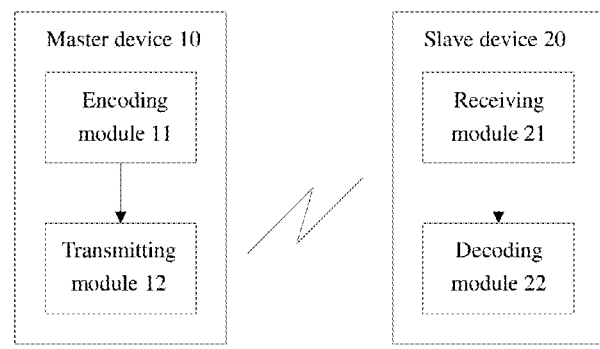
FIG. 8 is a diagram illustrating logic structure of an embodiment of the wireless communication system in the present invention.

FIG. 8 is a diagram illustrating logic structure of an embodiment of the wireless communication system in the present invention. The wireless communication system comprises a master device 10 and at least one slave devices 20 (only one is shown in the figure), and the mater device transmits an information to the slave device when it has a communication demand. The master device 10 comprises an encoding module 11 and a transmitting module 12. Wherein, the encoding module 11 is operable to encode an information code sequence including the communication demand into an awakening sequence, and the transmitting module 12 is operable to transmit the awakening sequence to each slave device continuously within a preset time period. Herein, the awakening sequence comprises at least two parts which have a preset correlation with each other; the preset time period is larger than or equal to a sum of a sleeping period and a detecting period of the slave device, wherein the sum of the sleeping period and the detecting period constitutes a sleeping-and-awakening cycle. The slave device 20 comprises a receiving module 21 and a decoding module 22. Wherein, the receiving module 21 is operable to receive the awakening sequence in the detecting period, and the decoding module 22 is operable to decode the awakening sequence, judge the correlation between the at least two parts, determine whether to be awakened according to a judging result and performs corresponding response according to the decoding information. It should be explained that the preferred embodiment in the wireless communication method can also be used for the wireless communication system.

It should be noted that the concept of master device and slave device in this document is a relative definition. Any device that needs to start the communication actively in the system can awaken and control other devices in accordance with the steps of the master device in this document. That is, the role of the master and slave devices can be interchanged flexibly. In addition, the encoder and decoder mentioned in the present invention can be implemented in hardware or software. Software is preferred to reduce costs and to achieve better flexibility.

Regarding the various encoding and information copying, it is possible to firstly carry out the encoding and copying before storing and then transmitting the result after a modulation. It is also possible to adopt the water-flowing method in which encoding and copying are carried out at the same time with modulation and transmitting.

The above description is only some preferred embodiments of the present invention instead of limitations of the present invention. Various modifications and changes can be made to the present invention for the skilled in the art. It will be appreciated that any modifications, equivalents and improvements made within the spirit and principles of the present invention should fall within the scope of the claims in the present invention.

The invention claimed is:

1. A wireless communication method for transmitting a message to a slave device of a plurality of slave devices when a master device receives a communication demand, comprising the following steps:

step (S1), encoding an information code sequence including the communication demand into an awakening sequence having a plurality of data packets and transmitting the awakening sequence to the plurality of slave devices continuously within a preset time period by the master device; wherein the awakening sequence comprises at least two parts which have a preset correlation with each other, and the preset time period is larger than or equal to a sum of a sleeping period and a detecting period of the slave device, wherein the sum of the sleeping period and the detecting period constitutes a sleeping-and-awakening cycle;

step (S2), receiving the awakening sequence in the detecting period, decoding the awakening sequence, judging the correlation between the at least two parts, determining whether to be awakened according to a judging result and performing a corresponding response according to decoding information decoded by the slave device;

wherein the step (S1) comprising the following steps:

step (S16), generating the information code sequence according to the communication demand, and outputting the information code sequence repeatedly in at least two channels according to the preset time period, a baud rate and a redundancy by the master device;

step (S17), encoding the information code sequence in at least one channel of the at least two channels to output an encoded result;

step (S18), combining outputs in each channel of the at least two channels so as to generate the awakening sequence by alternatively outputting one-digit information code in one channel and one-digit redundant code in another channel;

step (S19), transmitting the awakening sequence to the plurality of slave devices continuously within the preset time period;

wherein the step (S2) comprising the following steps:

step (S21), receiving the awakening sequence in the detecting period by the slave device;

step (S22), dividing the awakening sequence into two channels, wherein one channel is an information code sequence and other one channel is a redundant code sequence;

step (S23), encoding or decoding the awakening sequences in the two channels correspondingly to output a result;

step (S24), judging the correlation between outputs in each channel of the two channels, determining whether to be awakened according to a judging result and performing the corresponding response according to decoding information;

step (S25), carrying out a bit exclusive-or operation on the outputs in each channel of the two channels;

step (S26), judging a communication quality of a channel according to a ratio of the number of 1s to the entire number of symbols in the outputs;

wherein in the step (S1), each data packet of the awakening sequence carries a latency time information that is obtained by the slave device to calculate a time when the master device stops transmitting the awakening sequence in the preset time period;

in the step (S2), after receiving a segment of the awakening sequence in the detecting period, the slave device extracts the latency time information of a corresponding data packet, determines the time when the master device stops transmitting the awakening sequence in the preset time period according to the extracted latency time information, and starts to sleep before a determined time.

2. The wireless communication method of claim 1, wherein the step (S24) comprising:

step (S241), carrying out a bit exclusive-or operation on the outputs in each channel;

step (S242), judging whether the number of more than one continuous 0s in the outputs exceeds a preset value, or whether a ratio of the number of 1s to an entire number of the symbols in the outputs is smaller than a preset limit; if so, performing the corresponding response according to the communication demand; or else, entering a sleeping state.

3. The wireless communication method of claim 1, wherein the method further comprising the following steps after the step (S2):

step (S3), performing an error correction decoding on the received awakening sequence or the outputs in each channel of the at least two channels by usage of an error correction decoder so as to correct error codes during the communication and generating a right information code sequence.

4. The wireless communication method of claim 3, further comprising step of judging a communication quality of a channel according to a ratio of the number of 1s to an entire number of the symbols in the output during the error correction decoding.

5. The wireless communication method of claim 1, further comprising the step of inverting or descrambling the awakening sequence firstly and then decoding it after receiving the awakening sequence in the detecting period by the slave device in the step (S2) when the awakening sequence is inverted or scrambled after it is generated by the master device.

6. The wireless communication method of claim 1, wherein the communication demand comprises at least one of broadcasting awakening, grouping awakening, individual awakening, control instruction and data transmission.

* * * * *